(12) United States Patent
Mouzakitis et al.

(10) Patent No.: US 7,798,102 B2
(45) Date of Patent: Sep. 21, 2010

(54) GROWING SYSTEM FOR AQUATIC ANIMALS

(75) Inventors: Gerasimos C. Mouzakitis, Cork (IE); Eimear Helen McCarron, Co. Monaghan (IE); Gavin Burnell, Co. Cork (IE)

(73) Assignee: University College Cork (IE)

( * ) Notice: Subject to any disclaimer, the term of this patent is extended or adjusted under 35 U.S.C. 154(b) by 570 days.

(21) Appl. No.: 11/596,205

(22) PCT Filed: May 12, 2005

(86) PCT No.: PCT/IE2005/000053

§ 371 (c)(1),
(2), (4) Date: Dec. 31, 2007

(87) PCT Pub. No.: WO2005/110075

PCT Pub. Date: Nov. 24, 2005

(65) Prior Publication Data

US 2008/0223303 A1    Sep. 18, 2008

(30) Foreign Application Priority Data

May 14, 2004    (IE) ................................. 2004/0336

(51) Int. Cl.
*A01K 61/00* (2006.01)
*A01K 61/02* (2006.01)
(52) U.S. Cl. .................. 119/200; 119/215; 119/217
(58) Field of Classification Search ................ 119/200, 119/215, 217, 207, 221, 223, 234
See application file for complete search history.

(56) References Cited

U.S. PATENT DOCUMENTS

| 2,504,282 | A | * | 4/1950 | Tobias ...................... 119/51.03 |
| 3,194,211 | A | * | 7/1965 | Stanek ....................... 119/203 |
| 3,499,526 | A | | 3/1970 | Willinger ..................... 206/47 |
| 3,742,912 | A | | 7/1973 | Chen et al. ..................... 119/51 |
| 3,848,570 | A | * | 11/1974 | Scigliano ................. 119/51.03 |
| 3,964,438 | A | * | 6/1976 | Rodemeyer ................. 119/28.5 |
| 4,300,477 | A | * | 11/1981 | Chapman ..................... 119/210 |
| 4,434,745 | A | * | 3/1984 | Perkins et al. .............. 119/57.9 |
| 5,699,752 | A | * | 12/1997 | Wilkins .................... 119/51.03 |
| 5,806,458 | A | * | 9/1998 | Harwich .................. 119/51.03 |
| 5,826,541 | A | * | 10/1998 | Wilkins ..................... 119/57.8 |
| 5,954,012 | A | | 9/1999 | Jackson et al. .............. 119/230 |
| 7,114,461 | B2 | * | 10/2006 | Stence, Jr. ................... 119/234 |
| 2007/0084412 | A1 | * | 4/2007 | Eager ...................... 119/51.03 |

FOREIGN PATENT DOCUMENTS

JP    48 067 087    9/1973

OTHER PUBLICATIONS

PCT/ISA/210—International Search Report.

* cited by examiner

*Primary Examiner*—Yvonne R. Abbott
(74) *Attorney, Agent, or Firm*—Kusner & Jaffe

(57) ABSTRACT

The invention provides for an apparatus (1) for growing aquatic animals comprising at least two securing members (3, 6) adapted to be removably fixed together such that a feed substrate (7) can be reversibly sandwiched between the securing members. The invention also provides for modular assemblies of the apparatus, and further provides methods of culturing aquatic animals and methods of increasing roe content of aquatic animals.

15 Claims, 6 Drawing Sheets

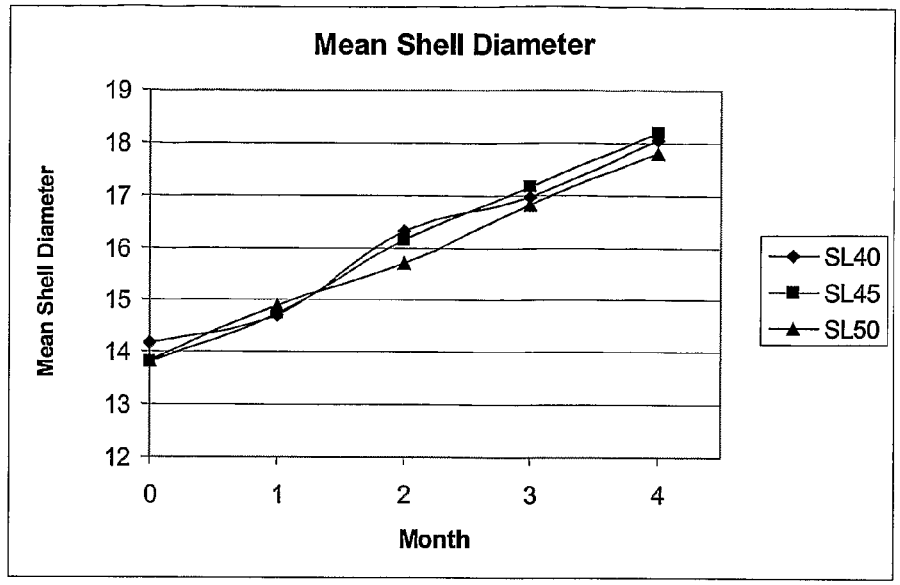
Figure 9. Graphical representation of mean shell diameter data shown in Table 1.
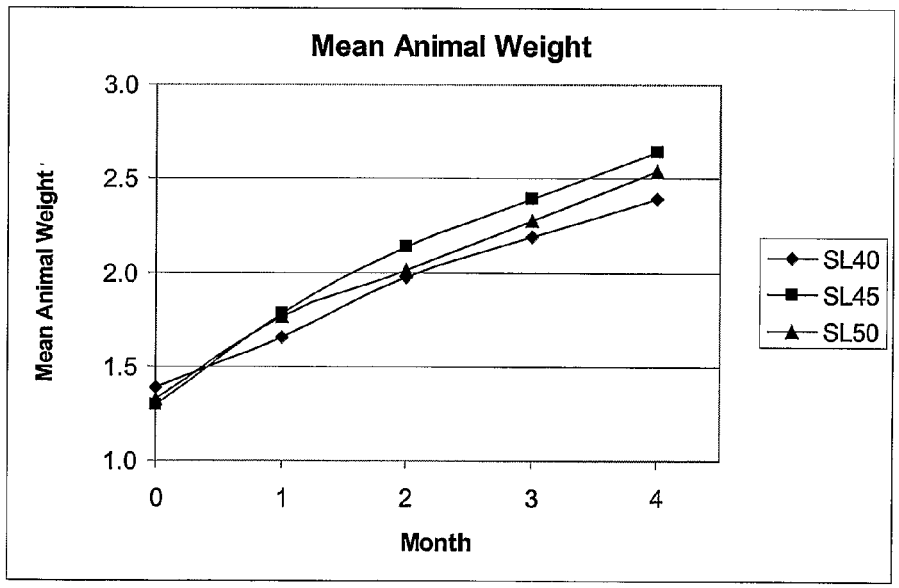
Figure 10. Graphical representation of mean animal weight data shown in Table 1.

GROWING SYSTEM FOR AQUATIC ANIMALS

BACKGROUND OF THE INVENTION

Animals which live in an aquatic environment have certain basic requirements for proper growth, such as an optimum water temperature range, photoperiod preference, salinity range, and feed preference. In addition to these basic requirements, certain aquatic animals, such as abalone, sea urchins, and periwinkles, require a surface on which to attach, and feed by roaming across the attached surface in search of food substances, for example micro algae and macro algae.

The situation is further complicated by the different needs and feeding patterns of different species of aquatic animal. Some species of animals roam until they find the feed, other species will wait until a piece of seaweed drifts by. Current methods for the farming of such grazing aquatic animals attempt to provide a support onto which the animals can attach and additionally provide a food substrate.

In the simplest of these methods, the animals are immersed in a bucket or tank of water, usually within an inner mesh cage to permit ease of collection and removal. Feed substrate is provided by means of adding sheets of macroalgae, for example seaweed (e.g. the brown macroalgae, *Laminaria* spp) to the tank. The animals attach onto the seaweed layers.

This method has a number of disadvantages; including, the seaweed and animals are in the water column and therefore obstruct the flow of water; collection of the animals is awkward due to their being irregularly scattered about a disorganised mass of seaweed; replacing old or rotting feed substrate is made difficult by the fact that animals are randomly adhered to the feed substrate; it is impractical to culture more than one species per tank or different ages of the same species as these will have to be sorted upon harvesting.

JP 2000/175,591 discloses a method of aqua culturing abalone and sea urchins in open sea. The marine creatures are provided with artificial and natural seaweed upon which to attach; set upon a grid system for growing the seaweed. This method, while avoiding the disadvantage of obstructed water flow, retains the remaining above disadvantages.

In an effort to provide additional support for the animals, alternative methods of aquaculture are used. These provide solid surfaces for the animals to adhere to; in the simplest embodiment, these take the form of corrugated plastic sheets positioned perpendicularly in a tank system. Feed is simply positioned between the corrugated plastic sheets. The animals attach onto the plastic sheeting and feed when some the feed comes in contact with the plastic sheet. Animals show a preference for attaching to a stable solid surface rather than to seaweed.

U.S. Pat. No. 4,253,418 discloses a method of abalone mariculture consisting of a tank with a series of inserts designed to greatly increase the available surface area for the animals to adhere to. These inserts are of the form of a plurality of grid sheets providing a multiplicity of intersecting surfaces suspended approximately vertically in a tank of water. However, these methods are inefficient as the animals attached to the solid surfaces need to roam continuously to acquire food and therefore consume energy, resulting in reduced size to feed ratios and also requiring a greater surface area per animal. Therefore, this type of method, while providing greater surface areas to attach to still retains some of the disadvantages attendant with the method of simply culturing the animals in a tank with free floating feed.

Therefore, there are several major disadvantages to the use of such growing systems. Most importantly, the feed (for example, sheets of macro algae) is in the water column while the animals are attached to the support surface. Therefore, the only feed that is accessible to the animals is the minority of feed which contacts the support surface. In aquaculture terms, the current systems for growing grazing animals have a low feed availability, as the majority of the feed is in the water column and does not contact the support surface.

Currently, grazing aquatic animals are fed freshly-harvested macroalgae, for example, fronds of the brown algae *Laminaria* spp. Such freshly harvested feed has a 'shelf life' of only several days before it begins to deteriorate and becomes unacceptable to the animals. Since in the current growing system a certain proportion of the feed is unavailable to the animals, a certain proportion of the feed will remained unconsumed until it begins to decompose and be unacceptable. Therefore, another disadvantage of the current growing methods is the uneconomical use of feed.

Moreover, in the current ongrowing systems the animals must wander on the support surface in search of feed contacting the surface. As a certain amount of surface area has to be provided per animal, the current ongrowing systems require a large surface area. In aquaculture terms, the current ongrowing systems have a low stocking density (i.e. the number of animals per unit area or volume). This requirement for a large surface area (low stocking density) is expensive and uneconomical both in terms of construction and running costs.

A further disadvantage of the current systems is the obstruction of water flow by the feed positioned in the water column. In all aquaculture systems a certain amount of water flow is required to provide oxygen and remove wastes. In the current ongrowing systems for grazing aquatic animals, the positioning of feed in the water column obstructs this water flow. This obstruction of the water flow by the feed results in lower oxygen and higher waste concentrations, and hence non-optimum growing conditions which may result in a lower growth rate for the animals.

To compensate for the obstruction of water flow by the feed, it is possible to increase the flow rate of the water by increasing pump flow (by using larger or additional water pumps). By increasing water flow though, construction and running costs (e.g. purchase and electricity for larger/additional pumps) are also increased. Furthermore, the higher water flow rate will cause faster 'mixing' of the feed in the water column. The feed will therefore have a shorter contact time with the support surface onto which the animals are attached and feed availability (and hence growth rate) will decrease.

JP 10,276,607 discloses a method of feeding artificial feed to sea urchins. This method comprises a solid card of artificial feed held vertically in place by a flange. One of the disadvantages associated with this method is that it relies exclusively on an artificial feed substrate. A further disadvantage is that the feed substrate may deteriorate over immersion time, and as it is consumed by the animals, resulting in a decrease in the security of its lodgement in the supporting structure.

There is thus a requirement for a growing system for grazing aquatic animals which allows for a high stocking density and provides for maximum feed availability with minimum obstruction to water flow.

OBJECT OF THE INVENTION

It is an object of the present invention to provide a growing system for grazing aquatic animals that permits uniform and consistent growth conditions for the grazing animals.

It is also an object of the present invention to provide a growing system for grazing aquatic animals that permits high stocking density of grazing aquatic animals with minimal obstruction to water flow.

It is also an object of the present invention to provide a growing system for grazing aquatic animals that can be utilized with equal convenience using both artificial and natural feed structures. It is a further object of the present invention to provide a growing system for grazing aquatic animals that can operate in any orientation.

It is a further object of the present invention to provide a growing system for grazing aquatic animals that permits the user to connect together a plurality of such growing systems in a modular fashion.

SUMMARY OF THE INVENTION

Accordingly, there is provided by the invention an apparatus for growing aquatic animals comprising:
- at least two securing members adapted to be reversibly fixed together such that a feed substrate can be reversibly sandwiched between the securing members.

There is also provided a growing system for growing aquatic animals or increasing roe content of aquatic animals comprising,
(i) retaining a feed substrate between at least two securing members,
(ii) inserting the feed substrate, sandwiched between the securing members, into a volume of water,
(iii) permitting aquatic animals to adhere to the feed substrate,
(iv) optionally disassembling the securing members and feed substrate, and inserting another feed substrate between the securing members.

Preferably, one or more of the feed substrate or securing members is substantially laminar.

In a preferred embodiment of the invention, two or more of the feed substrate and securing members are substantially laminar and are of complimentary shape. In further preferred embodiments, the laminar feed substrate is substantially planar.

Preferably, the securing members can reversibly be juxtaposed substantially parallel to each other. The feed substrate, when retained between the securing members, can provide a surface for the adherence of aquatic animals.

Preferably, at least one of the securing members is formed with at least one aperture. By aperture it will be appreciated that this term encompasses any hole, gap, slit, opening, orifice, slot, vent or the like. The aperture provides access to the feed substrate for the aquatic animals, permitting them to graze upon and adhere to the feed substrate. In preferred embodiments, at least part of at least one of the securing members is of the form of a mesh, grid, matrix, lattice, trellis, framework, grating, webbing or net. In an alternative embodiment, at least one of the securing members may engage the feed substrate by means of a partial grid, or by a prong or the like, thereby leaving an aperture available for access to the feed substrate. Depending on the users preference, at least one of the securing members can be configured so that detaching the securing member from the feed substrate also results in the forced detachment of any animal attached to the feed substrate.

Preferably, at least one of the securing members is composed of a material selected from the group consisting of metals, plastics, wood, composites, and combinations thereof, for example, PVC-coated stainless steel. The skilled person in the art will appreciate that there is an enormous variety and quantity of suitable materials and will be able to select the appropriate material or combination of materials thereof.

In one embodiment of the present invention, at least two of the securing members are integrally formed and joined by means of a connecting region. In such embodiments, the connecting region between the holding scaffold and the base structure is preferably composed of a flexible material. In a non-mutually exclusive embodiment of the present invention, at least two of the securing members are independently formed. Preferably, at least one of the securing members is formed with a means of attachment to at least one securing member.

In one embodiment of the present invention, the means of attachment between securing members may be selected from the group consisting of hinges, pin and socket hinges, ball and groove hinges, nut and bolt, push-fit arrangements, snap-lock arrangements, hooks, cords, wire, magnets, holding pins, catches on one of the securing members to permit another securing member to be slidably engagable into the catches thereon. The skilled user will appreciate that there are many methods of securably and reversibly attaching the securing members to each other.

In an alternative embodiment of the present invention, the apparatus further comprises an engagement means for connecting the apparatus to at least one other apparatus.

The present invention also provides a modular assembly, composed of interconnecting modular units, wherein each modular unit is adapted to be interconnectable with other modular units, such that at least one modular unit is an apparatus as claimed in any preceding claim, preferably with a plurality of the apparatus of the invention.

In one aspect of the invention, the modular assembly is constructed in the form of a cage, container or box or tank. Under certain circumstances and in use with certain aquatic creatures, this may permit the user to increase or improve the stacking ability or facility of the system within the aquaculture environment. In some aspects of these embodiments, not all the sides of the modular assembly are constructed of or comprise an apparatus of the invention. Most preferably, the left and right vertical sides comprise individual apparatuses, leaving the front/back vertical sides to permit the passage of water to move in and out of the internal volume as defined by the modular structure. The front and back sides of the modular assembly is preferably made of mesh to facilitate the water movement, but it will be appreciated that any provision of apertures or absence of a structure at all may provide a similar affect. The bottom of the modular assembly may also be adapted for waste removal, for example, by being constructed of mesh to facilitate the movement of waste out of the structure of the modular assembly, but it will be appreciated that any provision of apertures or absence of a structure at all may provide a similar affect.

In further embodiment, at least one side of each modular unit and one of the securing members of the apparatus is solid and waterproof, and the interconnecting regions between each modular unit is waterproof such that the modular assembly is capable of retaining liquid within the defined internal volume. This embodiment permits the user to use the growing systems to construct a self-contained aquaculture system, additionally acting as the water container itself. This embodiment has the additional advantage of providing a means to transport the sea creatures.

In one embodiment of the present invention, the apparatus or modular assembly is adapted be inserted into a container capable of retaining water, and the container comprises receiving members and the apparatus is adapted to engage with the receiving members. In a further embodiment, the container so described may comprise a plurality of interconnected modular members.

In the present invention, the feed can be replenished by separating the securing members and adding or replacing one or more layer(s) of feed substrate.

This growing apparatus, modular assembly and associated system have several advantages over current growing apparatus methods. The feed retained sandwiched between the securing members allows for both attachment and feeding and provide maximum availability of the feed substrate to adhering aquatic animals. Furthermore, since the feed substrate can be held laminar between the securing members, there is minimum obstruction to water flow.

By maximising feed substrate availability, this growing apparatus and system has several advantages. Firstly, as each animal does not need to move to attain feed, a small surface area is required for each animal. The number of animals per unit area (i.e. the stocking density), therefore, can be significantly increased over current growing systems. Moreover, as the invention provides a single surface for both attachment and feeding, that is, the feed substrate, the number of animals that can be grown in a unit volume of tank is much higher than in conventional systems. Furthermore, as all animals have equal access to the feed substrate, competition for feed may decrease, leading to less size variation.

By minimising obstruction to water flow by the feed substrate, the invention has several advantages. Water quality is improved as oxygen can be delivered and wastes removed easier than in conventional systems. Furthermore, the pump rate can be lower than in conventional systems since the water is not obstructed by the feed. Running costs, therefore, are decreased by the present invention.

In addition, the system can be used with artificial or natural feed substrates, in contained aquaculture environments, in open water, or alone, as used in a modular construction.

Definitions

Aquatic environment refers to any type of water environment, including seawater, saltwater, freshwater running water, brackish and any combination thereof.

Aquatic animal is any organism which lives, either fully or partially, in an aquatic environment.

Grazing aquatic animals refers to aquatic animals which feed by scraping or grazing. Most preferably, grazing aquatic animals refers to those aquatic animals which are edible. Grazing aquatic animals include, although are not limited to sea urchins, abalone and periwinkles.

If a grazing aquatic animal is an abalone it is a member of the family Haliotidae (all abalone as Haliotidae) and the genus *Haliotis*. Most preferably, abalone refers to, but is not limited to: *Haliotis discus hannai, Haliotis gigantea, Haliotis sieboldii, Haliotis ruber, Haliotis iris, Haliotis midae, Haliotis mykonosensis, Haliotis tuberculata, Haliotis cracherodii, Haliotis kamtschatkana, Haliotis rufescens, Haliotis poutalesii, Haliotis sorenseni*.

If a grazing aquatic animal is a sea urchin it is a member of the Class Echinoidea. A sea urchin most preferably belongs to the Subclasses Perischoechinoidea, Cidaroida, or Euechinoidea.

If it is a member of the Subclass Euechinoidea, it most preferably refers to, but is not limited to, the Infraclass Echinothurioidea or Acroechinoidea.

If it is a member of the Infraclass Acroechinoidea, it most preferably refers to, but is not limited to, the Cohort Diadematacea, Echinacea, or Irregularia.

If it a member of the Cohort Echinacea, it most preferably refers to, but is not limited to, the Superorder Stirodonta (Order Phymosomatoida, Family Arbaciidae, Genus Arbacia) or Superorder Camarodonta.

If it a member of the Superorder Camarodonta, it most preferably refers to, but is not limited to, the Order Echinidae and the Family Echinidae, Echinometridae, Strongylocentrotidae, or Toxopneustidae.

If it is a member of the Family Echinidae, it most preferably refers to, but is not limited to, the Genus *Echinus, Loxechinus, Paracentrotus,* or *Psammechinus*.

If it is a member of the Family Echinometridae, it most preferably refers to, but is not limited to, the Genus *Anthocidaris, Colobocentrotus, Echinometra, Evechinus,* or *Heliocidaris*.

If it is a member of the Family Strongylocentrotidae, it most preferably refers to, but is not limited to, the Genus *Hemicentrotus* or *Strongylocentrotus*.

If it is a member of the Family Toxopneustidae, it most preferably refers to, but is not limited to, the Genus *Lytechinus, Pseudoboletia, Pseudocentrotus, Toxopneustes,* or *Tripneustes*.

The grazing aquatic animal may also be a periwinkle or any other suitable species of grazing aquatic animal.

A grazing aquatic animal refers to both a naturally and non-naturally occurring organisms, including, but not limited to, species, varieties, variants, hybrids, genetically and/or chromosomally modified organisms, and variant related organisms not yet identified.

Feed refers to any source of food appropriate for an aquatic animal. Feed may be natural, artificial, combined with non-digestible material or any combination thereof.

Feed substrate refers to any type of feed inserted between the different surfaces. It can comprise a single layer, a multiplicity of layers, or overlapping layers of feed. In preferred embodiments, the feed substrate is laminar.

If the feed is natural it most preferably refers to single or a multiplicity of macroalgae and microalgae species.

If the feed is natural it may be growing, freshly harvested, or processed. For example, the feed may be grown within the cage system to provide a source of food. Alternatively, the feed may be grown elsewhere, harvested, and applied to the cage system. Alternatively, the feed may be grown elsewhere, processed and/or supplemented and applied to the cage system.

The feed substrate may also be processed.

Furthermore, the feed substrate can optionally be formed as a solid or semi-solid board, cake, or matrix, and can be considered as a feed substrate on its own or as a composition of base structure and feed substrate if sufficiently solid.

Tank system refers to an artificially created aquatic environment.

Plate refers to any surface. It can be planar, curved, or corrugated. It can be solid or perforated. It can be constructed from a single type of material or a multitude of materials.

The term "laminar" encompasses but is not limited to shapes such as planar, curved, convex, concave, corrugated, moulded and so on.

The invention will now be described with reference to specific embodiments.

BRIEF DESCRIPTION OF THE DRAWINGS

FIG. 9. Graphical representation of mean shell diameter data shown in Table 1.

FIG. 10. Graphical representation of mean animal weight data shown in Table 1.

DETAILED DESCRIPTION OF THE DRAWINGS

Figure 1:
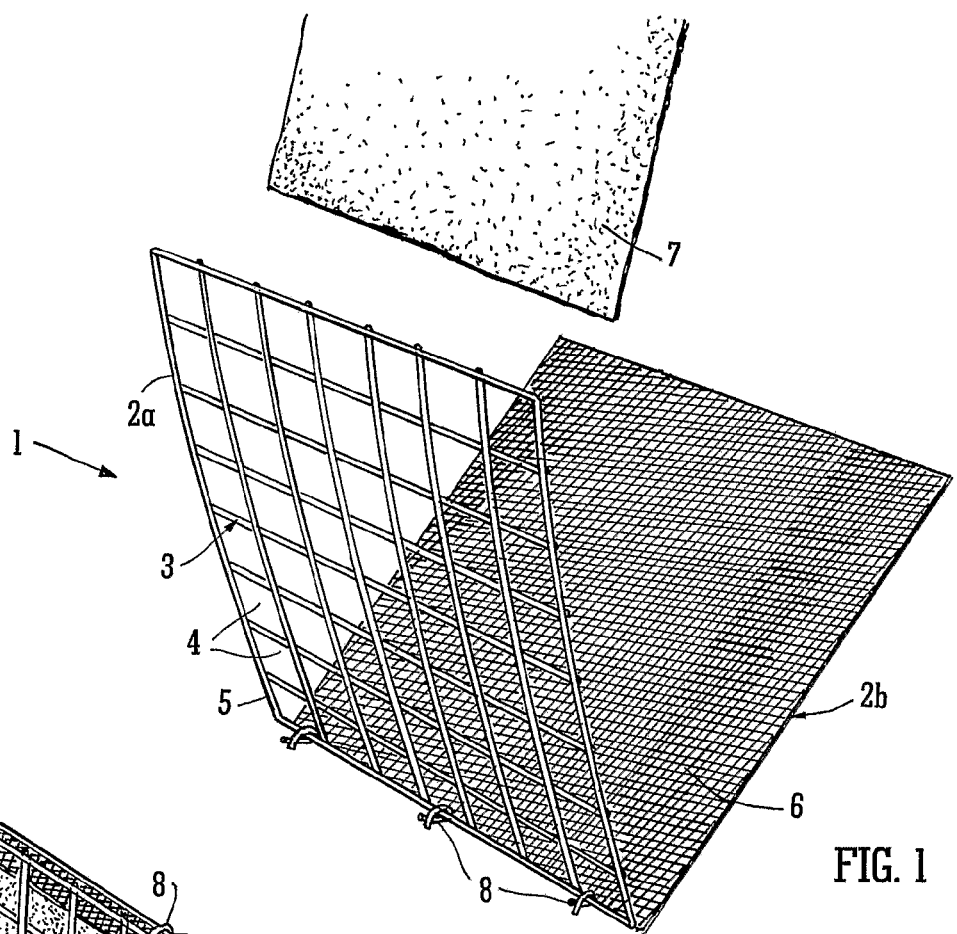
FIG. 1 is a perspective view of one embodiment of the invention (the 'single sided' version).

Referring to FIG. 1, there is provided generally an apparatus for growing aquatic animals (1). The apparatus (1) comprises two securing members (2a, 2b). The first securing member (2a) is in the form of a laminar holding scaffold (3) which is provided with plurality of apertures (4) defined by a mesh (5). The holding scaffold (3) is attached to a second securing member (2b). The second securing member (2b) is in the form of a laminar base structure (6). In the embodiment shown in FIG. 1, the laminar base structure (6) is composed of a denser mesh than the mesh comprising the laminar holding scaffold (3). A laminar sheet of feed substrate (7) is retainable between the holding scaffold (3) and the base structure (6). In a preferred method of use of this embodiment, multiple sheets of feed substrate (7) are retained by the apparatus (1), although for the purposes of clarity only a single sheet is represented in the accompanying drawings. A means of attachment (8) between the securing members (2a, 2b) in the form of a wire tie is provided to attach the holding scaffold (3) to the base structure (6). It will be appreciated that a variety of alternative means of attachments may be employed. Use of a wire tie, as shown in FIGS. 1 and 2 has the advantage of permitting variable volumes to be securely retained between the two securing members, reducing the risk of crushing the feed substrate layer(s) or limiting excess movement of the feed substrate layer(s) between the securing members.

Figure 2:
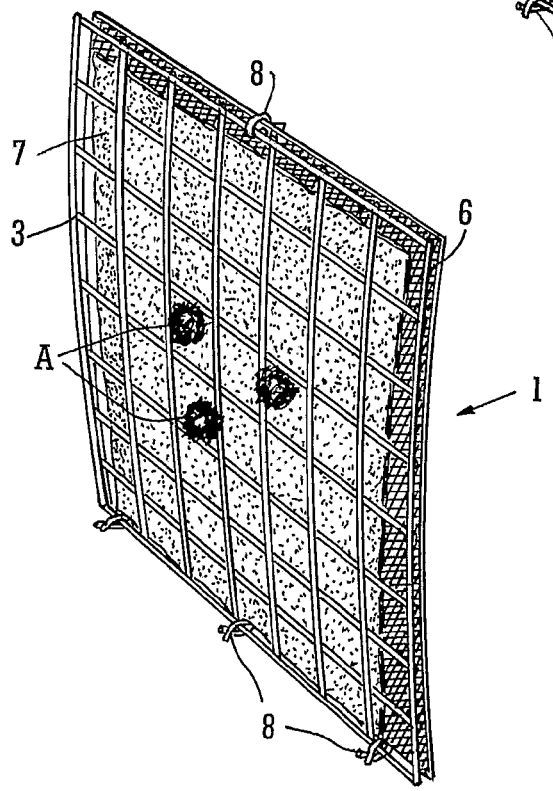
FIG. 2 is a perspective view of the embodiment of FIG. 1 in an assembled configuration.

Referring now to FIG. 2, the apparatus (1) is depicted assembled, with the holding scaffold (3) and base structure (6) retaining the feed substrate (7) between them. Aquatic animals (A) are depicted as adhered to the feed substrate. The embodiment of FIGS. 1 and 2 is termed 'Single-sided'.

Figure 3:
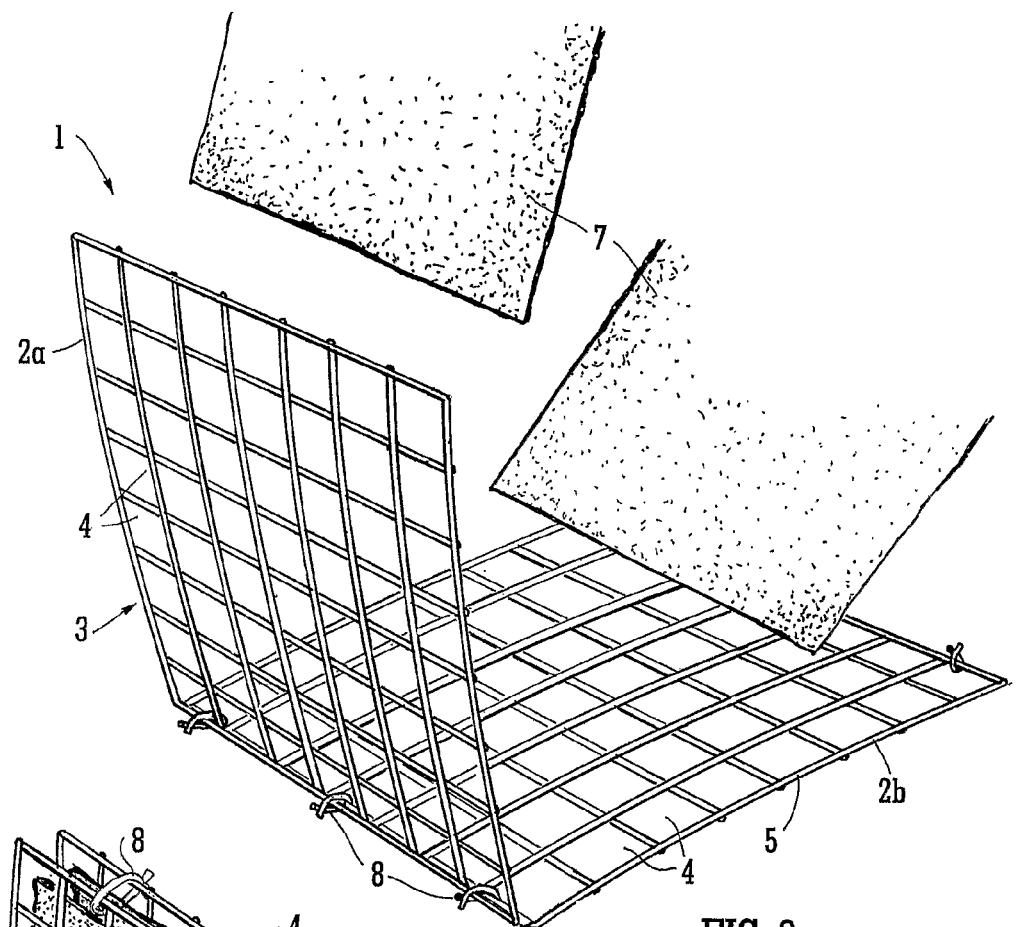
FIG. 3 is a perspective view of an alternative embodiment of the invention (the 'double sided' version).
Figure 4:
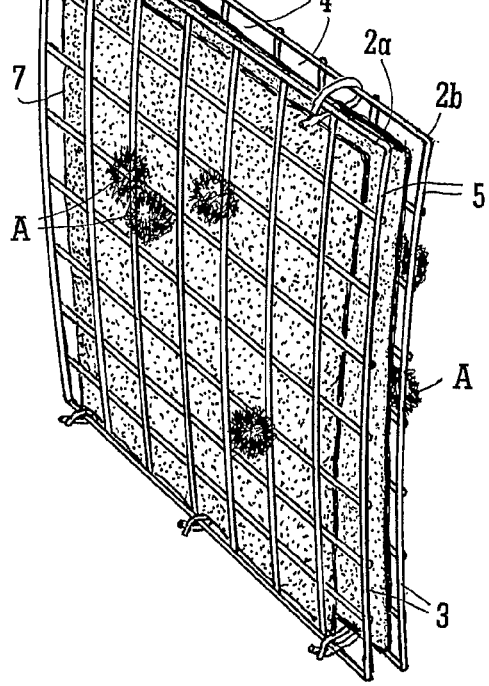
FIG. 4 is a perspective view of the embodiment of FIG. 3 in an assembled configuration.

Referring now to FIGS. 3 and 4 an alternative embodiment of the present invention is described, termed 'Double-sided'. The second securing member (2b) comprises a second holding scaffold (3), in that it is formed with a plurality of perforations (4). This permits adherence of animals (A) to both sides of the apparatus (FIG. 4).

Figure 5:
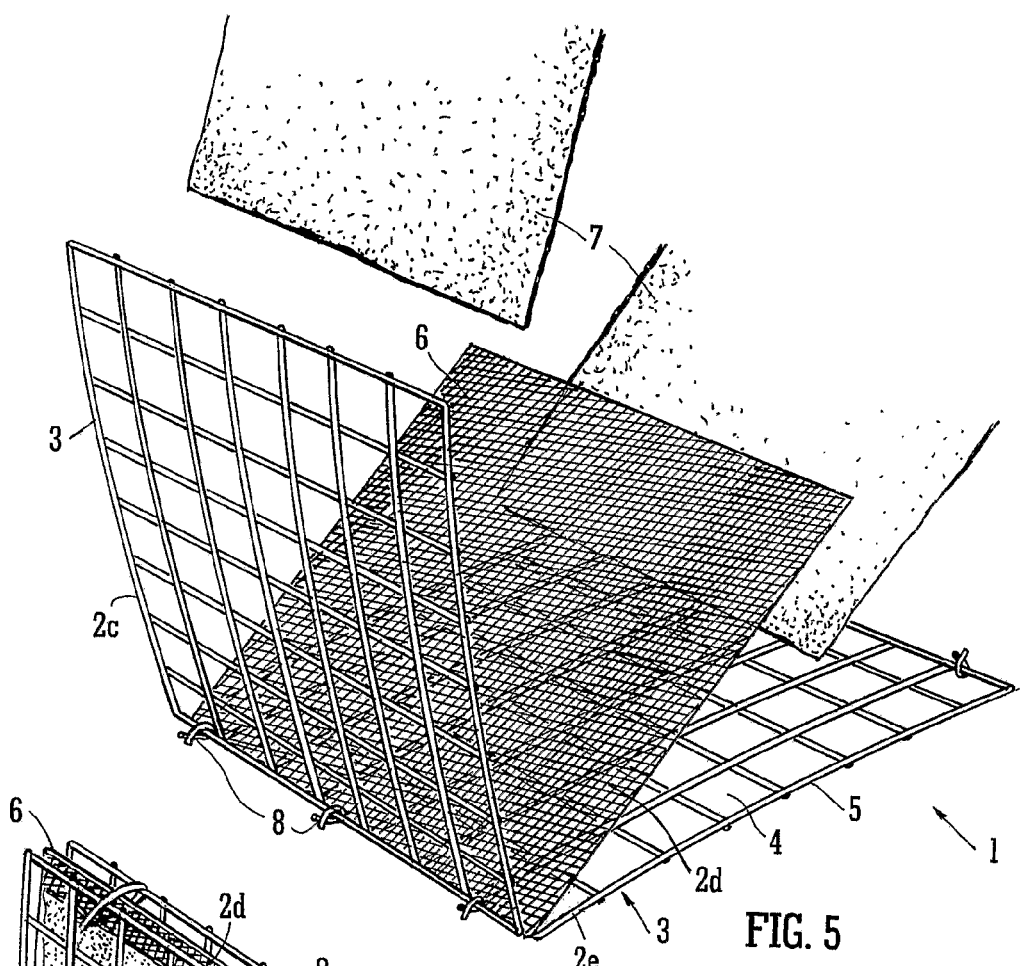
FIG. 5 is a perspective view of an alternative embodiment of the invention (the 'sandwich' version).
Figure 6:
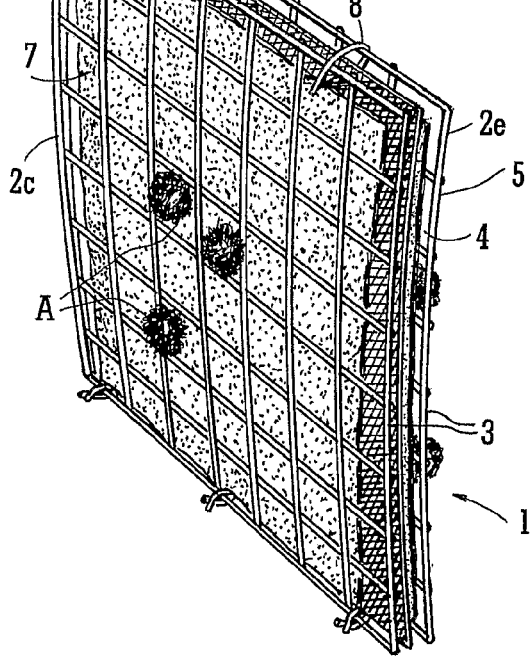
FIG. 6 is a perspective view of the embodiment of FIG. 5 in an assembled configuration.

Referring now to FIGS. 5 and 6, an alternative embodiment of the present invention is described, termed the 'Sandwich'. Three securing members (2c, 2d, 2e) are provided. One securing member (2d) acts as a base structure (6), while the remaining two securing members (2c, 2e) each act as holding scaffolds (3). Feed substrate (7) can be retained between the three securing members. This configuration results in two adhering surfaces on which the animals can attach and feed through the perforations in each holding scaffold.

Figure 7:
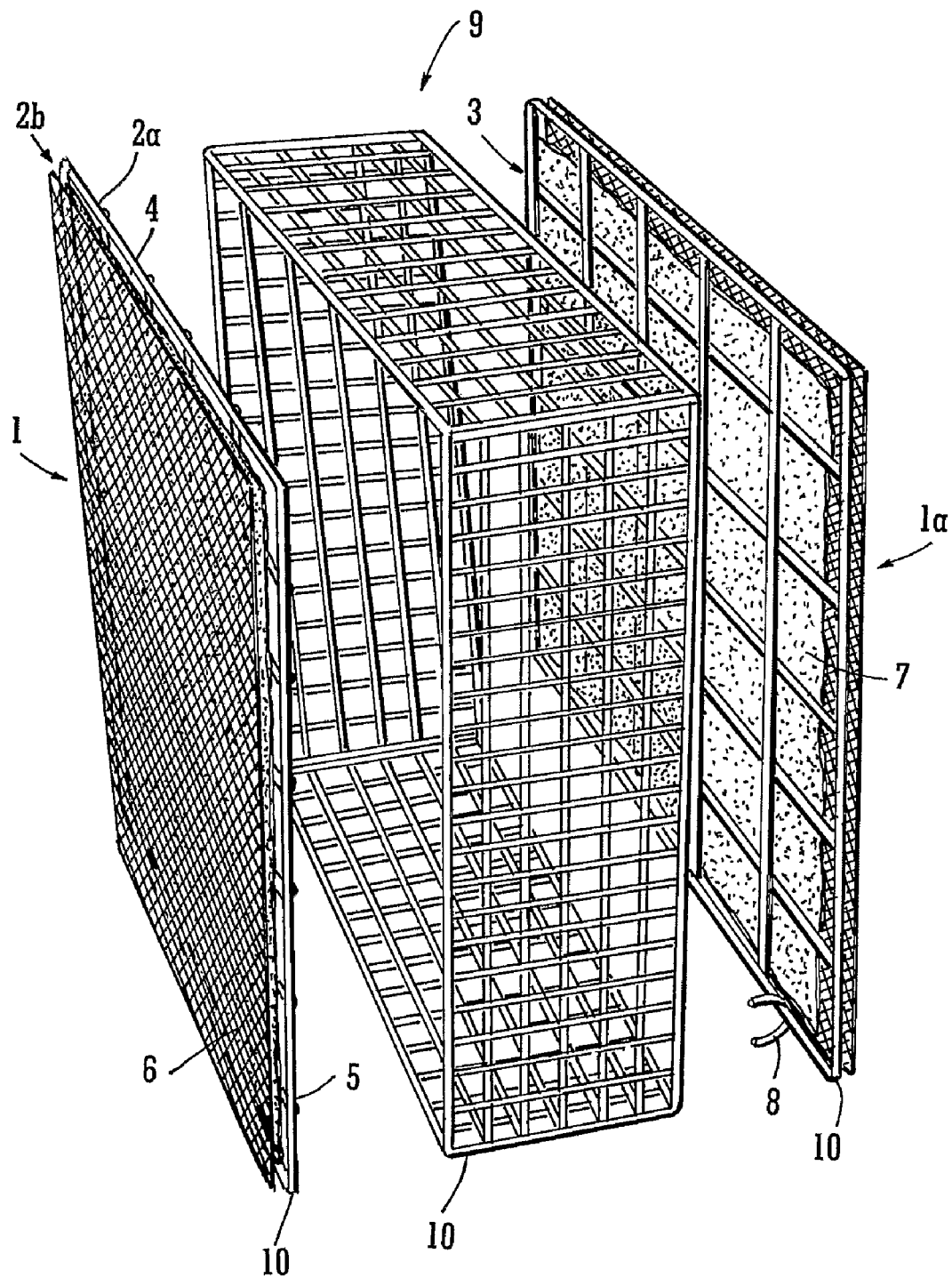
FIG. 7 is a perspective view of an alternative embodiment of the invention (the 'cage' version).

Referring now to FIG. 7 an alternative embodiment of the present invention is described, termed the 'Cage'. 2 apparatuses (1) and (1a) are interconnected to form a cage (9) by means of a modular assembly of modular units, (10). Depending on the combination of double or single sided systems, or sandwich versions of the present invention, animals may be cultured internally or externally of the cage. Using different feeds and/or mesh sizes for different regions of the cage permits the user to ensure different populations can be cultured separately. Alternative embodiments of the invention permit the user to substitute modular units in place of an assembled apparatus, in order to selectively build the desired structure. It will be appreciated that while FIG. 7 depicts an assembly of two apparatuses and 4 non-apparatus type modular units, any combination may be used.

Figure 8:
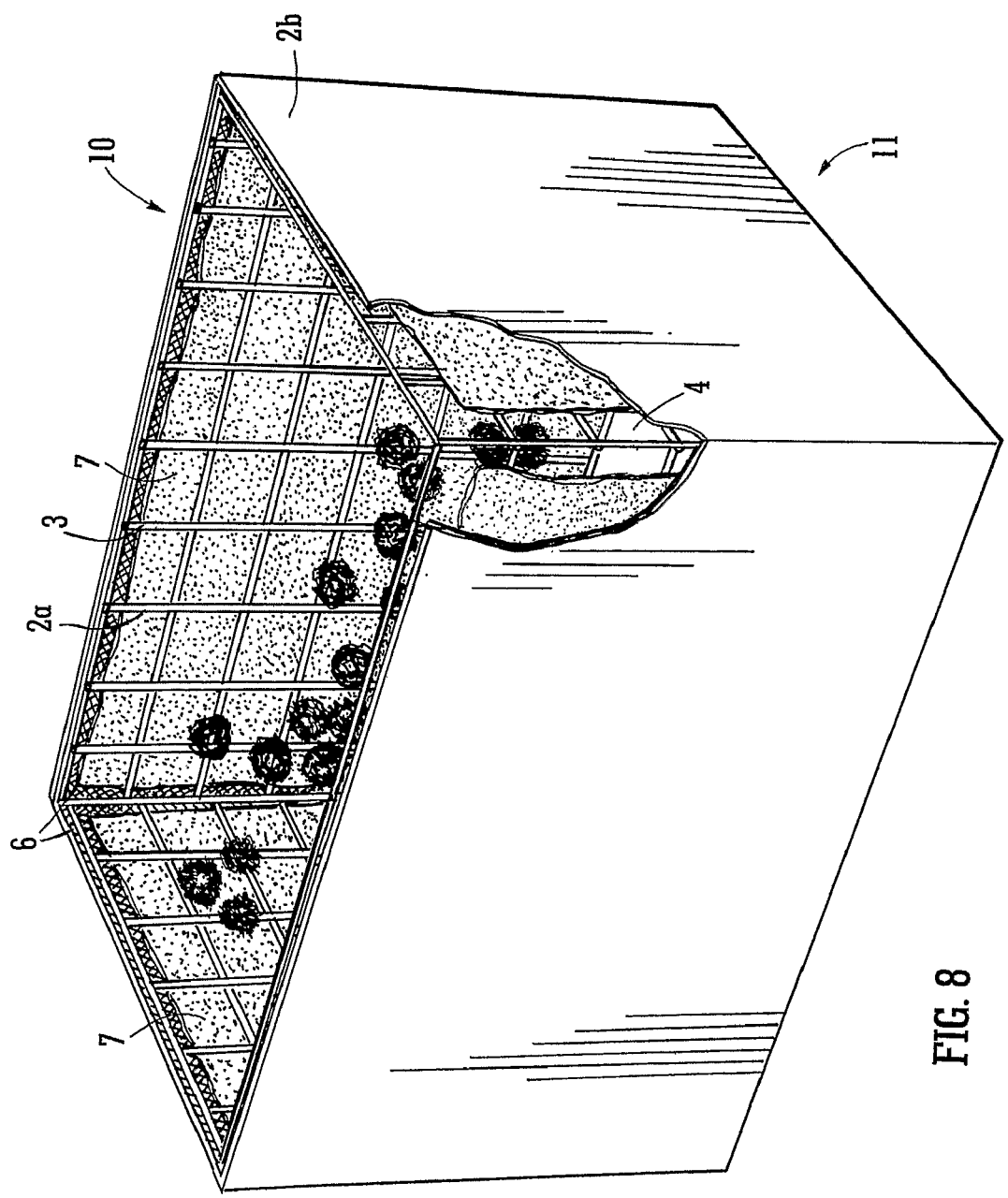
FIG. 8 is a perspective view of an alternative embodiment of the invention (the "tank" version).

FIG. 8 depicts an alternative embodiment, termed the 'Tank' in which one of the securing members (2b), in the form of a base structure (6), is composed of a waterproof material. A plurality, in this case five, modular units of the apparatus are connected together to form a modular assembly in the form of a watertight container (11). The first securing member (2a), in the form of a holding scaffold (3), is located facing the interior of the container, permitting adhesion and feeding of the animals (A) on the feed substrate (7). It will be appreciated that while FIG. 8 depicts 5 modular units comprising the tank, there is an infinite number of modular that may be used and combined to so form a suitable tank.

In alternative embodiments of the present invention, additional components may be used for attachment into tanks, for example grooves or complimentary projections adapted to accommodate the assembled apparatus or hooks or the like to receive and support the apparatus.

It will be appreciated that various combinations of the embodiments can be combined to provide a wide range of choice of growing conditions for various aquatic animals.

Most preferably, the cage (9) is rectangular box, although a person knowledgeable in the art would be able to decide the most appropriate type, configuration and format of cage.

Regardless of the exact configuration, the cage version of the present invention herein described provides for an enclosure and at least one surface that can allow for attachment and/or feeding of aquatic animals.

Most preferably, the present invention is utilised for growing grazing aquatic animals. The growing of aquatic animals may be for aquaculture (aquatic farming), ranching, stocking, re-stocking, or a combination of purposes. An individual or a multiplicity of aquatic animals may be grown simultaneously or consecutively.

Like all animals, grazing aquatic animals have feed preferences and require certain nutritional components in their feed for proper growth. The present invention can also be used to develop, test, assess, optimise and validate different feeds for a grazing aquatic animal. The feeds can be natural, artificial, or a combination thereof.

The present invention can also be used to develop, test, assess, and validate a single or a multiplicity of feed and/or diet constituents for an aquatic animal.

Regardless of the actual construction, the present invention provides a multitude of surfaces are utilised to provide an attachment and feeding for grazing aquatic animals.

The present invention can be constructed using a range of materials. For example, plastic tubing, PVC-coated galvanised steel, wire mesh. A range of configurations and attachments can be used to construct the present invention.

One of the applications of the present invention described in this patent involves the farming of grazing aquatic animals, such as abalone and sea urchins.

Another example of the applications of the present patent involves increasing the roe or gonad amount of sea urchins. Sea urchins from the wild do not always contain the maximum amount of gonad. The gonad content of sea urchins varies depending on the season (Unuma, T. (2000), "Gonadal growth and its relationship to aquaculture in sea urchins"; *The Sea Urchin: From Biology to Aquaculture:* Yokota, Matranga and Smolenicka, Italy, Swets & Zeitlinger, Lisse: 115-127); at certain times of the year, therefore, the gonad content will be minimal. Furthermore, due to environmental conditions or lack of natural feeds, at certain sites sea urchins can be found with little or no gonad. The present invention can be applied as follows: wild sea urchins of market size shell diameter can be harvested and maintained in the cages until the gonad content increases.

Yet another related application of the present application involves both farming and increasing the gonad content of the animals. For example, wild sea urchins that have not yet reached market size shell diameter can be harvested and maintained in the cages until the both the shell diameter and gonad content have reached certain values.

Another example of the applications of the present invention involves the assessment of different feeds for grazing aquatic animals. For example, the cage (9) can be utilised to test and assess the preference of a grazing aquatic animal to a feed substrate or feed substrate combination. A rectangular cage (9) is constructed in which the left and right vertical sides of the cage are replaced by the Single-Sided version of the invention. The feed substrate can be different species of macroalgae, artificial diet(s) or a combination. The two different types feed substrate are inserted into each side and grazing aquatic animals are positioned in the cage. Every several days, the weight of each type of feed is measured. The feed substrate which is consumed at a higher rate is preferred by the animals.

By sequentially repeating the above procedure with other combinations of feeds it is possible to determine the feed most preferred by the grazing aquatic animals.

This same method can be utilised to determine a combination of feed substrates than is more appropriate than each substrate alone. This same method can be utilised to formulate, develop, test and/or assess artificial diet(s) for aquatic animals.

In the above procedure it is also possible to measure the growth rate of the animals (by measuring their weight every several days) and determine a feed or the feed combination which provides for the maximum growth rate.

The securing members, holding scaffold, base structure, feed substrate and modular units of the invention are preferably laminar in configuration, ideally planar, although curved and corrugated shapes are also suitable. These plates can be composed of a single type of material or constructed from a mixture of materials.

A person knowledgeable in the art would be able to decide the rigidity, perforation-state, shape, and material composition of the securing members which retain the feed.

A person knowledgeable in the art would also be able to decide on the level, number, disposition and shape of the apertures on the securing member(s) that provide access to the underlying feed substrate.

The words "comprises/comprising" and the words "having/including" when used herein with reference to the present invention are used to specify the presence of stated features, integers, steps or components but does not preclude the presence or addition of one or more other features, integers, steps, components or groups thereof.

EXAMPLES

Example 1

Construction of Cages

In this example, a version of the cage embodiment was constructed (see FIG. 7). It is an example of the types of marine-grade materials that can be used to construct the embodiments of this invention. Furthermore, it is an example of the use of different materials for different size animals.

A central cage structure was constructed from a single piece of PVC-coated stainless mesh (either 0.25-inch (6.35 mm) or 0.5-inch (12.7 mm) mesh size) measuring three inches (7.62 cm) or five inches (12.7 cm) width and 42 inches (106.68 cm) length. The mesh was bent into right-angles to form the perimeter of a hollow box (10.5 inches by 10.5 inches, (26.67 mm by 26.67 mm)) and the ends secured using stainless steel hog rings.

Cage structures constructed with 0.25-inch (6.35 mm) mesh size PVC-coated stainless steel and a width of three inches (7.62 cm) were used with sea urchins with a shell diameter of less than 20 mm (it was found that sea urchins smaller than 20 mm shell diameter can escape from cage structures constructed using the 0.5-inch mesh (12.7 mm)). Cage structures with a three-inch (7.62 cm) width produced with 0.5-inch (12.7 mm) mesh size PVC-coated stainless steel were used with sea urchins with a shell diameter between 20 mm and 40 mm. For sea urchin with a shell diameter larger than 40 mm cage structures with a width of five inches (12.7 cm) constructed with 0.5-inch (12.7 mm) mesh size PVC-coated stainless steel were used.

Below is a summary of the sizes of PVC-coated stainless steel used for sea urchins of different size classes.

| Sea urchin Shell Diameter | Cage Width | Mesh Size |
| --- | --- | --- |
| Less than 20 mm | 3 inches | 0.25 inch |
| 20 mm to 40 mm | 3 inches | 0.5 inch |
| More than 40 mm | 5 inches | 0.5 inch |

For convenience, both metric and imperial units are utilised since it is standard to use millimeters in the scientific measurement of sea urchin shell diameter while the PVC-coated stainless steel mesh is typically available in imperial units.

Two vertical sides were also constructed. The construction of each side required two 10.5-inch by 10.5-inch (26.67 cm by 26.67 cm) square pieces of PVC-coated stainless steel with 0.25-inch (6.35 mm) and 1.5-inch (12.7 mm) mesh sizes. One 0.25-inch (6.35 mm) mesh size square was attached to a 1.5-inch (12.7 mm) mesh size square using cord on one side, thus forming a vertical side (sandwich). The cord allows attachment of the two square pieces and provides flexibility. Additional cords can be used to hold the assembled pieces together.

The assembled vertical sides were attached to the open sides of the hollow box using cord. The vertical sides were positioned so that the 1.5-inch (12.7 mm) mesh square faced the inside of the box.

Addition of feed to the cages can be performed by insertion of feed between the two mesh squares that comprise the vertical sides and reattachment of the vertical sides-feed to the cage structure. Positioning of the feed between the two mesh squares produces a surface on which marine grazing animals can attach and feed. For example, feed in the form of freshly harvested macroalgae (such as, *Laminaria digitata*) was cut into 10.5-inch (26.67 cm) lengths. It was inserted between the mesh square pieces comprising the vertical sides. The vertical sides with feed were attached to the cage structure using cord. Similarly, artificial feed diets (see EXAMPLE #3, below) can be produced as flat sheets which can be inserted between two mesh squares of the vertical sides.

Animals can be positioned inside the cage structure by removal of one of the vertical sides, insertion of the animals and reattachment of the vertical side.

Example 2

Growing of Pre-Market Sea Urchins in Cages

In this example, juvenile sea urchins are grown in the cages for 16 weeks, demonstrating that sea urchins can feed and grow in the present invention. Juvenile sea urchins (of shell diameter of less than 15 mm) were chosen as they are the most sensitive to environmental stress.

In this example, sea urchins, of approximately 14 mm shell diameter, were maintained in the cages for 16 weeks at three different stocking levels (number of animals per cage): 40, 45, and 50 animals per cage. The experiment was performed in triplicate, that is three cages were used for each stocking level. Initially, and every four weeks thereafter, all the animals were sampled to determine the animal weight and shell diameter.

The feed used throughout the 16-week trial was freshly harvested fronds of the macroalgae *Laminaria digitata*. Feed was replenished every week and the amount inserted in each cage and that remaining after seven days was measured.

Tank System and Water Quality Monitoring

A standard tank system was utilised for this growth. A GlobalOceans AquaCycler V1.0 was utilised. This tank system is a simple rounded-corner rectangular tank with a water capacity of approximately 5,000 L. In the bottom of the tank approximately 2.5 metric tonnes of ¾ inch (19.05 mm) limestone chips have been placed to assist in biological filtration of the tank water. Water recirculation is through a standard air-lift system followed by a protein skimmer.

Aeration of the seawater in the tank is accomplished through a network of perforated tubing secured on the bottom of the tank resting on the limestone chips.

Although a particular tank system was utilised for this Example, any standard aquaculture tank system would be appropriate for use with the present invention.

Approximately 10% of the total seawater volume in the tank system was replenished every week. Monitoring of water quality parameters (such as ammonia, nitrite, nitrate levels) was performed on a weekly basis; all water quality measurements were within acceptable limits. Dissolved oxygen ranged between 99% to 100% saturation throughout the 16-week growth trial.

Water temperature was maintained at 17-17.5° C. using a stainless steel water-heating element inserted in the main body of the tank.

Sea Urchins

Sea urchins (European sea urchin, *Paracentrotus lividus*) were sourced from a commercial sea urchin hatchery (Dunmanus Seafoods Ltd., Co. Cork, Ireland). Upon delivery, the animals were allowed to acclimatise to the tank system for at least seven days with no feed prior to placement in the cages and initiation of the growth trial.

Cages

As the sea urchins used in this example have a test diameter of less than 20 mm, the cage structures were three inches in width and constructed with 0.25-inch (6.35 mm) mesh PVC-coated stainless steel (as described in Example #1, above).

Size and Growth

At the first day of the growth trial (Month 0, Day 0) all animals were sampled to determine total animal weight and shell diameter. The mean length of the sea urchins was 13.938±1.668 mm (mean±standard deviation) with a mean total weight of 1.34 grams. The animals were randomly distributed into cages (three cages for each stocking level of 40, 45, and 50 animals per cage).

Every four weeks all the animals in the growth trial were sampled to determine total animal weight and shell diameter. The mean animal weight and shell diameter was calculated for all the animals in each stocking level; see Table 1 and FIGS. 9 and 10.

TABLE 1

Growth of Sea urchins During Four Month Maintenance in the Cages.

| | Stocking Level | Month 0 | 1 | 2 | 3 | 4 | Total |
|---|---|---|---|---|---|---|---|
| Mean Shell Diameter (in mm) | SL40 | 14.18 | 14.70 | 16.32 | 16.97 | 18.05 | 3.88 |
| | SL45 | 13.80 | 14.75 | 16.16 | 17.17 | 18.19 | 4.39 |
| | SL50 | 13.83 | 14.90 | 15.71 | 16.83 | 17.80 | 3.98 |
| Mean Animal Weight (in grams) | SL40 | 1.39 | 1.66 | 1.97 | 2.19 | 2.39 | 1.00 |
| | SL45 | 1.30 | 1.78 | 2.13 | 2.40 | 2.64 | 1.34 |
| | SL50 | 1.33 | 1.77 | 2.01 | 2.28 | 2.54 | 1.22 |

"Total" column - difference between values in Month 4 and Month 0; the total increase in shell diameter and weight.

At the onset of the experiment there was no statistically difference in both the initial shell diameters ($F_{8, 404}$=0.8, P>0.605) and mean animal weights ($F_{8, 404}$=0.52 405, P=0.839) in all cages and stocking levels.

At the end of the growth trial, there was no significant difference (P>0.5) in both the mean test diameter ($F_{8, 404}$=1.71 405, P=0.094) and mean animal weights ($F_{8, 404}$=0.67 405, P=0.717) in all cages and stocking levels.

In comparing the mean shell diameter between Month 0 and Month 4 a highly significant difference (P<0.01) ($F_{1, 809}$=141.17, P=0.007) was observed within and across all stocking levels, indicating that the animals grew during the course of the 16-week growth period in the cages.

The total growth of the sea urchins during the 16-week growth trial, in terms of increase in shell diameter and total wet weight, is shown in Table 1 (column labeled "Total"). Mean shell diameter increased approximately 4 mm, while the mean animal weight increased 1.0 to 1.34 grams in all stocking levels.

No animal mortalities were observed during the 16-week growth trial. The lack of any mortalities in these juvenile animals, throughout the 16-week growth trial, indicates that this system results in minimal to no stress.

Feed Consumption

Feed consumption was monitored by measuring the total wet weight of the macroalgae inserted into the two vertical sides of each cage during feed replenishment (labelled "Day 0-wet", Table 2) and the wet weight of the unconsumed feed seven days later (labeled "Day 7-wet", Table 2).

As is standard practice, feed consumption is calculated in terms of dry weight of feed. In order to convert Day 0-wet weights to Day 0 dry weights, a simple experiment was performed at the onset of the growth trial. A known wet weight of macroalgal feed (in this case *Laminaria digitata*) is dried in a 100° C. oven for 24 hours and the dry weight is measured. A Day 0 conversion factor is calculated from the equation below:

Day 0 conversion factor=Dry weight/wet weight.

The Day 0 factor for conversion of the wet weights to dry weight for the *Laminaria digitata* used in this growth trial was 0.1918. The Day 0 wet weights were multiplied by this factor to converted to dry weight, see Table 2 (column labelled "Day 0-Dry").

Conversion of the Day 7 wet weights of the macroalgal feed to dry weight was performed as described in McBride et al., 2004 (McBride, S. C., Price. Tom, P., Lawrence, J. M., & Lawrence, A., 2004. Comparison of gonad quality factors: Colour, hardness and resilience, of *Strongylocentrotus franciscanus* between sea urchins fed prepared feed or algal diets and sea urchins harvested from the Northern California fishery. Aquaculture, Vol. 233, 405-422). Since the macroalgal feed is maintained in seawater for seven days two conversion factors are used to take into account both the change in water content and the loss of dry matter due to wilting of the macroalgal plants. To calculate these conversion factors a known wet weight (Day 0-wet) of feed was maintained in our tank system for seven days. At day 7 the wet weight was measured (Day 7-wet). The feed was dried in a 100° C. oven for 24 hours and the dry weight (Day 7-dry) was measured.

The first conversion factor for Day 7 feed was calculated from the equation:

Conversion factor #1=Day 7-dry/Day 7-wet.

In the case of the *Laminaria digitata* used in the growth trial, Conversion factor #1 was calculated as 0.1493.

The second conversion factor for Day 7 feed takes into account loss of dry matter and it is calculated using the equation:

Conversion factor #2=Day 0 Conversion factor/(Day 7-Dry/Day 0-wet).

In the case of the *Laminaria digitata* used in the growth trial, Conversion factor #2 was calculated as 1.2538.

The Day 7 unconsumed feed wet weights were converted into dry weights by multiplying all values by 0.1493 (Conversion factor #1) followed by multiplication by 1.2538 (Conversion factor #2); see Table 2 (columns labeled "Day7-Dry").

Feed consumption was calculated as the difference in dry weights between Day 0 and Day 7; see Table 2 (columns labeled "Consump"). Over the 16-week growth trial sea urchins in the three stocking levels (40, 45 and 50 animals per cage in triplicate) consumed 797.74 grams, 951.86 grams, and 933.30 grams of feed, respectively.

Feed Consumption and Growth

In a commercial setting, analysis of feed consumption and growth (as either change of shell diameter or total animal weight) can be used to determine financially important variables such as the efficiency of the farming method. In aquaculture terms, a major parameter of efficiency is the feed conversion efficiency, defined as the amount of feed required to result in a unit of growth.

Table 3 shows the feed conversion efficiency for the 16-week growth trial described above. In term of animal weight as a measure of growth, this analysis indicates that this faming method has a dry weight feed efficiency of 14.6% at a stocking level of 40 animals per cage. At the stocking levels of 45 and 50 animals per cage the feed efficiency increases to 18.9% and 19.5% respectively.

TABLE 3

Feed Consumption Efficiency

| | | | SL40 | SL45 | SL50 | Notes |
|---|---|---|---|---|---|---|
| Feed | Consumed Feed (g dry wt) | g dry wt | 797.74 | 951.86 | 933.30 | 1 |
| | Consumed Feed (g wet wt) | g wet wt | 4,181.03 | 4,988.77 | 4,891.51 | 2 |
| Biomass | Δ Biomass | g wet wt | 116.7 | 179.44 | 182.34 | 3 |
| (Animal | FCR (Dry wt-Consumed feed) | % | 14.6% | 18.9% | 19.5% | 4 |
| Weight) | | grams | 6.8 | 5.3 | 5.1 | 5 |
| | FCR (Wet wt-Consumed feed) | % | 2.8% | 3.6% | 3.7% | 4 |
| | | grams | 35.8 | 27.8 | 26.8 | 5 |
| Shell | Δ Total Shell Diameter | mm | 367.23 | 575.58 | 596.49 | 6 |
| Diameter | FCR (Dry wt-Consumed feed) | grams/mm | 2.17 | 1.65 | 1.56 | 7 |
| | FCR (Wet wt-Consumed feed) | grams/mm | 11.39 | 8.67 | 8.20 | 7 |

Notes
1. Consumed Feed (g dry wt) is taken from Table 2: Consumption. In grams dry weight.
2. Consumed Feed expressed as wet weight. Calculated by applying Equation A to Total Consumption g dry weight (Table 4).
3. The difference in total animal weight (biomass) between Month 0 and Month 4.
4. Overall feed conversion ratio - expressed as percentage.
5. Overall feed conversion expressed as grams feed required for each gram increase in biomass.
6. Increase in total test diameter length of all sea urchins in each stocking density.
7. Overall feed conversion expressed as grams feed required for each mm increase in shell diameter.

Although it is usual for the scientific community to express feed conversion efficiency in terms of dry feed weight, feed efficiency expressed as wet weight can be more directly commercially applicable as is usually not possible, or economical, for farms to dry the feed. In Table 3 the feed efficiency has also been calculated in terms of the wet weight of the feed. To perform these calculations, the consumed dry weight valued were converted to wet weight using the equation:

Consumed wet weight=consumed dry weight/0.1918 in which 0.1918 is the Day 0 conversion factor calculated above.

In terms of wet feed weight it was found that 35.8 grams of wet feed is required for an animal weight gain of one gram at a stocking level of 40 animals per cage. At a stocking level of 45 and 50 animals per cage, 27.8 and 26.8 grams of feed are required for an animal weight gain of one gram.

A similar analysis of efficiency can be performed using the increase on shell diameter as a measure of growth; see Table 3. In terms of dry feed efficiency, 2.17 grams, 1.65 grams and 1.56 grams of dry feed weight are required for an increase of one mm in shell diameter for the stocking levels of 40, 45 and 50, respectively. Similarly, 11.39 grams, 8.67 grams and 8.20 grams of wet feed are required for the stocking levels of 40, 45 and 50, respectively.

Example 3

The Use of Natural and Processed Diets for Growing of Sea Urchins

In this example sea urchins are maintained in cages for four months (16 weeks) and fed either a natural or an experimental artificial feed. The aim of this example is to demonstrate that both natural and artificial or processed feed preparations can be utilised with this invention.

Tank System and Water Quality Monitoring

As described for Example #2 above.

Cages

As the sea urchins utilised in this example have a test diameter in the range of 20 to 40 mm, the cage structures were three inches in width and constructed using 0.5 inch mesh size PVC-coated stainless steel.

Sea Urchins

Sea urchins (European sea urchin, *Paracentrotus lividus*) were sourced from a commercial sea urchin hatchery (Dunmanus Seafoods Ltd., Co. Cork, Ireland). Upon delivery the animals were allowed to acclimatise to the tank system for at least seven days with no feed previous to placement in the cages and initiation of the growth trial.

Feed Preparations

Two different feeds were utilised. Freshly harvested fronds of the macroalgae *Laminaria digitata* (labelled *Laminaria*), and a commercially-available, experimental artificial diet produced by extrusion cooking (labeled Artificial). The artificial diet was produced in a laminar form and specifically in the shape of a wafer (rectangular, flat).

As described for Example #2 above, the *Laminaria* feed was cut into 10.5 inch pieces and inserted in the vertical sides of the cages. The *Laminaria* feed was removed every seven days and fresh feed inserted in the vertical sides.

For the Artificial diet, the wafer pieces were inserted into the vertical sides of the cages. The Artificial feed was removed every 3.5 days and new feed inserted in the vertical sides. (Preliminary 'shelf life' experiments had indicated that the artificial diet wafer disintegrates if maintained in seawater for more than 4 days).

Size and Growth

Sea urchins of approximately 23 mm mean shell diameter were randomly distributed into cages at a stocking level of 20 animals per cage. The animals in four cages were fed freshly harvested macroalgae for 16 weeks (as described for Example #2). The animals in the remaining four cages were fed the artificial diet preparation.

Sampling of all animals was performed every month (four weeks) to determine changes in mean shell diameter and mean animal weight.

TABLE 4

Growth of sea urchins in cages using both a natural and artificial diet

| | Feed | Month | | | | |
|---|---|---|---|---|---|---|
| | | 0 | 1 | 2 | 3 | 4 |
| Mean Shell Diameter (in mm) | Laminaria | 23.30 | 23.63 | 24.77 | 25.69 | 25.54 |
| | Artificial | 23.21 | 23.68 | 24.67 | 24.86 | 25.16 |
| Mean Animal Weight (in grams) | Laminaria | 6.11 | 5.92 | 6.41 | 6.69 | 6.90 |
| | Artificial | 5.91 | 6.08 | 6.10 | 6.22 | 6.12 |

Initially (in Month 0) there was no difference in the mean shell diameter ($F_{3, 80}$=0.3, P=0.586) and mean animal weight ($F_{3, 80}$=0.0, P=0.995) between the cages containing the *Laminaria* feed. Similarly, there was no difference in the mean shell diameter ($F_{3, 80}$=0.16, P=0.693) and mean animal weight ($F_{3, 80}$=0.34, P=0.561) between the cages containing the artificial diet.

At the end of the 16-week growth trial (Week 16, Month 4), there was no difference in the mean shell diameter ($F_{3, 80}$=0.8, P=0.370) and mean animal weight ($F_{3, 80}$=0.23, P=0.631) between the cages containing the *Laminaria* feed. Similarly at Month 4, there was no difference in the mean shell diameter ($F_{3, 80}$=1.3, P=0.257) and mean animal weight ($F_{3, 80}$=3.76, P=0.056) between the cages containing the artificial diet.

A significant difference was observed in comparing the mean shell diameter ($F_{2, 160}$=37.30, P=0.000) and mean animal weight ($F_{2, 160}$=1.75, P=0.007) between Month 0 and Month 4 in the cages containing the *Laminaria* feed. A significant difference was observed in comparing the mean shell diameter ($F_{2, 160}$=30.02, P=0.000) and mean animal weight ($F_{2, 160}$=1.47, P=0.04) between Month 0 and Month 4 in the cages containing the Artificial feed.

Consumption, Feed Development and Costs

The observations that sea urchins consume both natural and artificial feeds and grow in these cages demonstrates that the present invention is suitable as a farming method.

Example 4

Increasing the Roe (Gonad) Content of Market Size Sea Urchins

In this example the cages are used to increase the roe or gonad content of market-size sea urchins harvested from the wild. It demonstrates the application of the present invention at the end of the farming cycle at which point the animals have reached market-size shell diameter. (Examples #2 and #3 above related to the beginning and middle sections of the farming cycle, respectively). Furthermore, it demonstrates the application of the present invention as a system for increasing the gonad content of wild sea urchins.

Wild sea urchins were harvested from a specific site known to contain an abundance of market-size animals. The animals were maintained in the cages for either three or nine weeks and fed a natural macroalgal diet. At the end of each growth treatment the animals were dissected and the weight of the gonad was measured.

Tank System and Water Quality Monitoring

As described for Example #2 above.

Cages

As the sea urchins utilised in this example have a test diameter of more than 40 mm, the cage structures were five inches in width and constructed using 0.5 inch mesh size PVC-coated stainless steel; as described in Example #1.

Sea Urchins

Market size animals (shell diameter of 50 to 60 mm) of the European sea urchin, *Paracentrotus lividus*, were harvested from a specific area of Dunmanus Bay, County Cork, Ireland.

Upon harvesting, the animals were allowed to acclimatise the tank system for several hours before placement in the cages at a stocking level of eight animals per cage.

All treatments were performed in quadruplicate (four cages, 32 sea urchins in total for each treatment).

Feeding

The feed used was freshly harvested fronds of the macroalgae *Laminaria digitata*. Feed was replenished every seven days.

Gonad Content and Gonadal Index

The gonad content of sea urchins was calculated by measuring the total wet weight of the animal, followed by dissection, and removal and measurement of the total wet weight of the gonad.

The standard index of gonad content, the gonadal index (GI) was calculated as a percentage of total animal weight using the equation:

% $GI$=(Wet weight of gonad/total wet animal weight)×100.

Change in Gonadal Index

At the onset of this example (Day 0), a total of 96 wild sea urchins were harvested from a specific site. The animals were randomly distributed into three groups of 32 animals: initial sampling, three-week growth, and nine week growth. The animals in the initial sampling group were immediately sampled for total animal wet weight, shell diameter and gonad content (see Table 5). The total wet weight and shell diameter of the remaining sea urchins was measured and they were placed in cages (at a stocking level of eight animals per cage). They were maintained in the cages for either three or nine weeks.

TABLE 5

Gonadal Content Following Maintenance of Market-Size Sea Urchins in Cages

| Wild | | |
|---|---|---|
| L | W | % GI |
| 53.00 | 59.05 | 4.98 |

| | Three week group | | | Nine week group | | |
|---|---|---|---|---|---|---|
| Wk | L | W | % GI | L | W | % GI |
| 0 | 52.74 | 58.24 | — | 54.43 | 58.55 | |
| 1 | | FEED | | | FEED | |
| 2 | | | | | | |
| 3 | | | | | | |
| 4 | 51.92 | 57.31 | 7.24 | | | |
| 5 | | | | | | |
| 6 | | | | | | |
| 7 | | | | | | |
| 8 | | | | | | |
| 9 | | | | 52.40 | 58.42 | 9.29 |

Wk = Week
L = mean shell diameter (in mm)
W = mean total wet animal weight (in grams)
% GI = gonadal index as a percentage At the end of Week 3 and Week 9, the sea urchins in each group (four cages, 32 animals) were sampled for total animal weight, shell diameter and gonad content (see Table 5).

In the original harvest, the sea urchins contained a mean % GI of 4.98%; that is, the gonad wet-weight was 4.98% of the total animal weight. Following three weeks in the cages (Three week group), the mean gonad content increased highly significantly (P<0.001) to 7.24%. Following nine weeks in the cages, the mean gonad content increased highly significantly (P<0.001) to 9.29% (Nine week group), an increase of 86% from the original wild gonad content.

TABLE 2

Consumption of Macroalgal Feed

| | | SL40 | | | | | SL45 | | | | |
|---|---|---|---|---|---|---|---|---|---|---|---|
| | | Wet Wt | | | | | Wet Wt | | | | |
| | | Day 0- | Day 7- | Dry Wts | | | Day 0- | Day 7- | Dry Wts | | |
| M | Week | Wet | Wet | Day 0-Dry | Day 7-Dry | Consumption | Wet | Wet | Day 0-Dry | Day 7-Dry | Consumption |
| 1 | 1 | 585.49 | 268.08 | 111.71 | 50.18 | 61.53 | 472.21 | 237.14 | 90.10 | 44.39 | 45.71 |
| | 2 | 845.58 | 357.34 | 161.34 | 66.89 | 94.45 | 742.38 | 296.72 | 141.65 | 55.54 | 86.10 |
| | 3 | 640.57 | 246.50 | 122.22 | 46.14 | 76.08 | 638.94 | 240.01 | 121.91 | 44.93 | 76.98 |
| | 4 | 650.52 | 178.58 | 124.12 | 33.43 | 90.69 | 733.54 | 198.28 | 139.96 | 37.12 | 102.84 |
| 2 | 5 | 655.08 | 375.36 | 124.99 | 70.26 | 54.72 | 667.80 | 389.79 | 127.42 | 72.97 | 54.45 |
| | 6 | 669.02 | 246.81 | 127.65 | 46.20 | 81.45 | 767.32 | 270.09 | 146.40 | 50.56 | 95.85 |
| | 7 | 559.52 | 453.66 | 106.76 | 84.92 | 21.83 | 692.76 | 529.93 | 132.18 | 99.20 | 32.98 |
| | 8 | 535.46 | 402.76 | 102.17 | 75.39 | 26.77 | 600.13 | 428.96 | 114.50 | 80.30 | 34.21 |
| 3 | 9 | 611.32 | 372.52 | 116.64 | 69.73 | 46.91 | 612.77 | 356.70 | 116.92 | 66.77 | 50.15 |
| | 10 | 584.22 | 417.22 | 111.47 | 78.10 | 33.37 | 535.61 | 350.59 | 102.19 | 65.63 | 36.57 |
| | 11 | 574.86 | 409.71 | 109.68 | 76.69 | 32.99 | 679.86 | 335.10 | 129.72 | 62.73 | 66.99 |
| | 12 | 503.99 | 373.16 | 96.16 | 69.85 | 26.31 | 464.63 | 334.60 | 88.65 | 62.63 | 26.02 |
| 4 | 13 | 524.92 | 214.23 | 100.15 | 40.10 | 60.05 | 737.77 | 171.61 | 140.77 | 32.12 | 108.64 |
| | 14 | 523.44 | 408.91 | 99.87 | 76.54 | 23.33 | 564.20 | 405.91 | 107.65 | 75.98 | 31.67 |
| | 15 | 589.27 | 395.68 | 112.43 | 74.07 | 38.36 | 660.50 | 343.28 | 126.02 | 64.26 | 61.76 |

TABLE 2-continued

| Consumption of Macroalgal Feed | | | | | | | | | |
|---|---|---|---|---|---|---|---|---|---|
| 16 | 536.72 | 392.67 | 102.41 | 73.50 | 28.90 | 610.84 | 403.85 | 116.55 | 75.60 | 40.95 |
| TOTAL: | 9,589.98 | 5,513.19 | 1,829.77 | 1,032.03 | 797.74 | 10,181.26 | 5,292.56 | 1,942.58 | 990.73 | 951.86 |

| | | SL50 | | | | |
|---|---|---|---|---|---|---|
| | | Wet Wt | | Dry Wts | | |
| M | Week | Day 0-Wet | Day 7-Wet | Day 0-Dry | Day 7-Dry | Consumption |
| 1 | 1 | 568.91 | 187.57 | 108.55 | 35.11 | 73.44 |
| | 2 | 666.65 | 300.36 | 127.20 | 56.23 | 70.97 |
| | 3 | 710.71 | 185.53 | 135.60 | 34.73 | 100.87 |
| | 4 | 833.84 | 260.42 | 159.10 | 48.75 | 110.35 |
| 2 | 5 | 768.22 | 486.19 | 146.58 | 91.01 | 55.57 |
| | 6 | 667.81 | 381.75 | 127.42 | 71.46 | 55.96 |
| | 7 | 652.54 | 528.28 | 124.50 | 98.89 | 25.61 |
| | 8 | 626.78 | 377.98 | 119.59 | 70.75 | 48.83 |
| 3 | 9 | 666.48 | 366.41 | 127.16 | 68.59 | 58.58 |
| | 10 | 603.75 | 453.51 | 115.20 | 84.89 | 30.30 |
| | 11 | 674.30 | 350.14 | 128.66 | 65.54 | 63.11 |
| | 12 | 476.02 | 312.70 | 90.82 | 58.54 | 32.29 |
| 4 | 13 | 611.64 | 233.71 | 116.70 | 43.75 | 72.95 |
| | 14 | 514.40 | 379.28 | 98.15 | 71.00 | 27.15 |
| | 15 | 692.40 | 350.99 | 132.11 | 65.70 | 66.41 |
| | 16 | 606.63 | 399.78 | 115.75 | 74.84 | 40.91 |
| | TOTAL: | 10,341.08 | 5,554.60 | 1,973.08 | 1,039.78 | 933.30 |

M = Month (four weeks)
SL40, SL45, SL50 = stocking levels 40, 45 and 50, respectively
Wet Wt = Wet weight of feed at Day 0 and Day 7.
Dry Wt = Dry weight of feed at Day 0 and Day 7, calculated as described in the text.
All values in grams.

The invention claimed is:

1. A modular assembly, comprising interconnecting modular units, wherein each modular unit is adapted to be interconnectable with other modular units, such that at least one modular unit comprises an apparatus for growing aquatic animals comprising at least two securing members adapted to be removably fixed together such that a feed substrate can be reversibly sandwiched between the securing members wherein the modular assembly is constructed in the form of a cage, container, box or tank.

2. An apparatus or modular assembly as claimed in claim 1 adapted to be inserted into a container capable of retaining water, wherein the apparatus is adapted to securely and reversibly engage with receiving members on the container.

3. A modular assembly as claimed in claim 1 wherein the modular assembly is constructed with at least four vertical sides comprising left, right, front and back vertical sides, such that the left and right vertical sides each comprise an apparatus for growing aquatic animals and the front and back vertical sides each permit the passage of water in and out of the internal volume of the modular structure.

4. A modular assembly as claimed in claim 1 wherein at least one side of each modular unit and one of the securing members of the apparatus is solid and waterproof, and the interconnecting regions between each modular unit is waterproof such that the modular assembly is capable of retaining liquid within the defined internal volume.

5. A modular assembly as claimed in claim 1 wherein the feed substrate and securing members are of substantially complimenting shapes.

6. A modular assembly as claimed in claim 1 wherein the securing members can reversibly be fixed substantially parallel to each other.

7. A modular assembly as claimed in claim 1 wherein one or more of the feed substrate or securing members is substantially laminar.

8. A modular assembly as claimed in claim 1 wherein the feed substrate, when retained between the securing members, provides a surface for the adherence of aquatic animals.

9. A modular assembly as claimed in claim 1 wherein at least one of the securing members is formed with at least one aperture.

10. A modular assembly as claimed in claim 1 wherein at least part of at least one of the securing members is of the form of a mesh, grid, matrix, lattice or net.

11. A modular assembly as claimed in claim 1 wherein at least one of the securing members is composed of a material selected from the group consisting of metals, plastics, wood, composites, and combinations thereof, for example, PVC-coated stainless steel.

12. A modular assembly as claimed in claim 1 wherein at least one securing member is formed with a means of attachment to another securing member.

13. A modular assembly as claimed claim 1 wherein at least two of the securing members are integrally formed and joined by means of a connecting region, composed by a flexible material.

14. A modular assembly as claimed in claim 1 wherein at least two of the securing members are independently formed.

15. A method of growing aquatic animals or increasing roe content of aquatic animals comprising the use of a modular assembly as claimed in claim 1 and,
  (i) retaining the feed substrate between the support members,
  (ii) inserting the feed substrate, sandwiched between the support members, into a volume of water,
  (iii) permitting aquatic animals to adhere to the feed substrate,
  (iv) Optionally disassembling the support members and feed substrate, and inserting another feed substrate between the support members.

* * * * *